US010766632B2

(12) United States Patent
Le Provost et al.

(10) Patent No.: US 10,766,632 B2
(45) Date of Patent: Sep. 8, 2020

(54) SYSTEM AND METHOD TO MANAGE CHECK-LISTS FOR AN AIRCRAFT PILOT

(71) Applicant: AIRBUS OPERATIONS (S.A.S.), Toulouse (FR)

(72) Inventors: Freddy Le Provost, Toulouse (FR); Alexandre Duchevet, Pont du Casse (FR); Estelle Delpech, Plaisance du Touch (FR); Vincent Souffrant, Toulouse (FR); Benoît Papaïx, Toulouse (FR); Nicolas Chatrenet, Pibrac (FR); Yannick Deleris, Toulouse (FR)

(73) Assignee: Airbus Operations (SAS), Toulouse (FR)

( * ) Notice: Subject to any disclaimer, the term of this patent is extended or adjusted under 35 U.S.C. 154(b) by 0 days.

(21) Appl. No.: 16/238,059

(22) Filed: Jan. 2, 2019

(65) Prior Publication Data

US 2019/0202577 A1 Jul. 4, 2019

(30) Foreign Application Priority Data

Jan. 4, 2018 (FR) ..................................... 18 50037

(51) Int. Cl.

| | |
|---|---|
| ***G08B 21/00*** | (2006.01) |
| ***B64D 45/00*** | (2006.01) |
| ***B64D 43/00*** | (2006.01) |
| ***G08B 7/06*** | (2006.01) |
| ***B64D 47/02*** | (2006.01) |
| ***B64C 19/00*** | (2006.01) |

(Continued)

(52) U.S. Cl.

CPC .............. *B64D 45/00* (2013.01); *B64C 13/10* (2013.01); *B64C 19/00* (2013.01); *B64D 43/00* (2013.01); *B64D 47/02* (2013.01); *G06F 3/014* (2013.01); *G06F 3/04842* (2013.01); *G08B 7/06* (2013.01)

(58) Field of Classification Search

CPC ......... B64C 13/10; B64C 19/00; B64D 31/04; B64D 43/00; B64D 45/00; B64D 47/02; G06F 3/014; G06F 3/04842; G08B 7/06

USPC .......................................................... 340/945

See application file for complete search history.

(56) References Cited

U.S. PATENT DOCUMENTS 3,059,062 A 10/1962 Ojala
2006/0149439 A1* 7/2006 Poier .................... G01C 23/005 701/1

(Continued)

OTHER PUBLICATIONS

Search Report for FR 1850037, dated Aug. 28, 2018, 1 page.

*Primary Examiner* — Naomi J Small

(74) *Attorney, Agent, or Firm* — Nixon & Vanderhye P.C.

(57) ABSTRACT

A system (1) including an identification unit (2) for identifying at least one actuation element to be actuated to implement a current control from a check-list, a signaling unit (3) for visually highlighting the identified actuation element, a detection unit (4) for detecting a position of a hand of a pilot, a checking unit (5) for checking whether the detected position of the hand of the pilot is consistent with the position of the identified and highlighted actuation element for the actuation thereof, an alert unit (6) for alerting the pilot to a risk of incorrect actuation, in case of absence of consistency between the detected position of the hand of the pilot and the position of the actuation element, and a recovery unit (15) for identifying, in case of incorrect actuation, at least one suggest correct actuation element.

19 Claims, 5 Drawing Sheets

Detect 4
10
Detect 12
13
ID 2
Check 5
Check 14
Recov. 15
Check 18
Monitor 16
19
8
34
17
Signal 3
9
Sound 7
11
6
1

(51) Int. Cl.

| | |
|---|---|
| ***G06F 3/0484*** | (2013.01) |
| ***B64C 13/10*** | (2006.01) |
| ***G06F 3/01*** | (2006.01) |

(56) References Cited

U.S. PATENT DOCUMENTS

2007/0146334 A1* 6/2007 Inokawa ............... G06F 3/0414 345/173
2007/0198141 A1* 8/2007 Moore ................... G01D 5/342 701/3
2014/0292685 A1* 10/2014 Meegan .............. G06F 3/04883 345/173
2014/0320321 A1 10/2014 Loubiere et al.
2015/0298816 A1 10/2015 Ouelette et al.
2016/0107763 A1* 4/2016 Giuliano ............... G10L 15/183 701/29.1
2016/0152330 A1 6/2016 Mercer et al.
2017/0228095 A1* 8/2017 Domaradzki ........... G06F 3/048

* cited by examiner

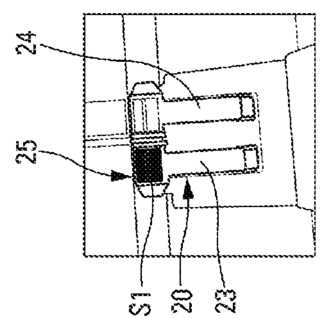
Fig. 3A
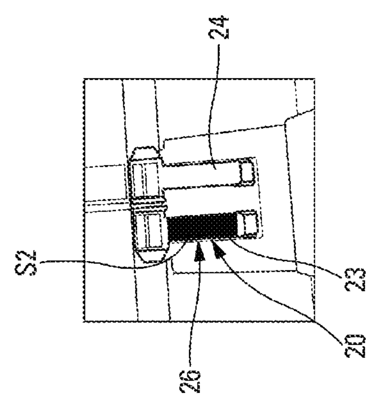
Fig. 3B
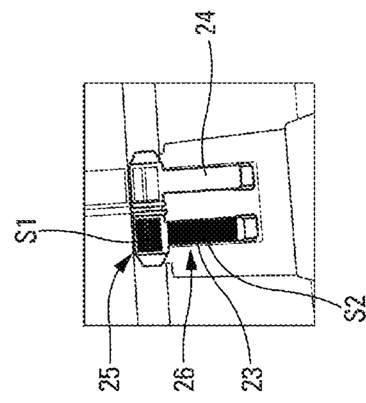
Fig. 3C
Fig. 4A
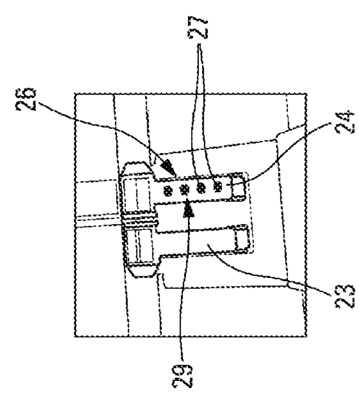
Fig. 4B
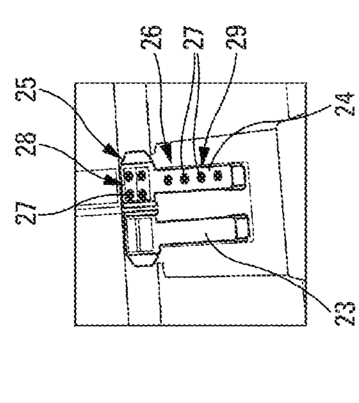
Fig. 4C

SYSTEM AND METHOD TO MANAGE CHECK-LISTS FOR AN AIRCRAFT PILOT

RELATED APPLICATION

This application claims priority to French Patent Application patent application 1850037 filed 4 Jan. 2018, the entirety of which is incorporated by reference.

FIELD

The present invention relates to a method and a system for aiding a pilot of an aircraft in managing check-lists.

BACKGROUND

To control complex systems of an aircraft, such as a transport airplane, the aircrew of the aircraft often uses predetermined lists of controls, such as check-lists. Check-lists include a series of commands (or procedures) of actions that the aircrew must carry out by acting on actuation elements in the aircraft. An "actuation element" means any member, button, lever or control means or any touch element present on the aircraft and capable of being actuated (touched, pressed, pulled, etc.) by a member of the aircrew to command the implementation of a particular action in the aircraft.

On commercial transport airplanes piloted by at least two pilots, for the implementation of such a check-list, generally, one of the pilots, namely the PM ("Pilot Monitoring") pilot who monitors the flight, reads through the various controls (or procedure steps) of the check-list, and the other pilot, namely the PF ("Pilot Flying") pilot who pilots the aircraft, performs the actions requested for each of these controls or procedure steps. The PM pilot who reads the actions simultaneously monitors the actions carried out by the PF pilot, and thus makes it possible to prevent actuation errors such as an actuation on a wrong system, not involved in the current procedure, or an incorrect control or positioning of a correct actuation element.

Despite this monitoring by the PM pilot, actuation errors are not excluded. This standard solution concerning the management of a check-list is not therefore fully satisfactory.

SUMMARY

An invention has been made that is disclosed herein to reduce the risk of actuation errors. The invention may be embodied as a method for aiding in the management of at least one check-list, managed by at least one pilot of an aircraft.

The invention may be embodied as a method including:

(i) an identification step, implemented by an identification unit, which identifies at least one actuation element to be actuated to implement a current control from a check-list;

(ii) a signaling step, implemented by a signaling unit, which visually highlights the identified actuation element;

(iii) a detection step, implemented by a detection unit, consisting in detecting a position at least of a hand of a pilot;

(iv) a checking step, implemented by a checking unit, including checking whether the detected position of the hand of the pilot is consistent with the position of the identified and highlighted actuation element, for the actuation thereof; and (v) a first alert step, implemented by an alert unit, including alerting the pilot to a risk of incorrect actuation, in case of absence of consistency between the detected position of the hand of the pilot and the position of the actuation element.

The method guides the pilot in the action to carry out by highlighting the actuation element to be actuated to implement the current control from the check-list, and alerting the pilot of a possible intention to perform an incorrect actuation so that, if the pilot agrees that the actuation is incorrect, the pilot will abstain from performing the incorrect actuation. The method is an aid to the performance of a check-list and reduces the risk of actuation errors in managing the check-list.

The method may also comprise a second alert step, implemented by the alert unit, that informs the pilot in case of an incorrect actuation.

Furthermore, the method may also comprise a recovery step, implemented by a recovery unit, including identifying, in case of incorrect actuation (for a reversible control), at least one actuation element making it possible to remedy the situation generated by the incorrect actuation, the identified actuation element being highlighted.

Moreover, the method may also comprise a first confirmation step, implemented by a confirmation unit, including confirming an actuation intention that is considered to conform (or be consistent), when the checking step concludes on a consistency between the detected position of the hand of the pilot and the position of the actuation element.

Furthermore, the method may comprises a second confirmation step, implemented by the confirmation unit, including confirming a correct actuation of an identified and highlighted actuation element.

Furthermore, the alert step may include implementing at least one of the following alerts: at least one visual alert and at least one audible alert.

Moreover, the method may also include the following steps, implemented before the identification step:

(i) a monitoring step, implemented by a monitoring unit, including detecting, in the monitoring, if appropriate, a particular condition relating to the implementation of a check-list; and (ii) a checking step, implemented by a checking unit, including checking, in case of detection of a particular condition relating to the implementation of a check-list, whether the check-list corresponds to at least one predetermined check-list, the identification step being implemented only when the check-list corresponds to a predetermined check-list.

The present invention may be embodied as a system for aiding in the management of at least one check-list, managed by at least one pilot of an aircraft. The system may comprise:

(i) an identification unit configured to identify at least one actuation element to be actuated in order to implement a current control from a check-list;

(ii) a signaling unit configured to visually highlight the identified actuation element;

(iii) a detection unit configured to detect a position at least of a hand of a pilot;

(iv) a checking unit configured to check whether the detected position of the hand of the pilot is consistent with the position of the identified and highlighted actuation element for the actuation thereof; and (v) an alert unit configured to alert the pilot to a risk of incorrect actuation, in case of absence of consistency between the detected position of the hand of the pilot and the position of the actuation element.

Moreover, the system may comprise:

(i) a monitoring unit configured to detect, in the monitoring, if appropriate, a particular condition relating to the implementation of a check-list;

(ii) a data base storing one or more predetermined check-lists; and (iii) a checking unit configured to check, in case of detection of a particular condition relating to the implementation of a check-list, whether said check-list corresponds to one of said check-lists stored in the data base.

Furthermore, the system may comprise a confirmation unit configured to confirm an actuation intention that conforms or a correct actuation.

Moreover, the system may comprise a recovery unit, configured to identify, in case of incorrect actuation, at least one actuation element making it possible to remedy the situation generated by the incorrect actuation, the identified actuation element being highlighted by the signaling unit.

Furthermore, the detection unit may comprise a plurality of sensors; and/or the signaling unit may comprises a plurality of signaling elements.

The present invention relates also to an aircraft, in particular a transport airplane, which is provided with at least one system for aiding in the management of a check-list, such as that described above.

BRIEF DESCRIPTION OF THE FIGURES

The attached figures will give a good understanding of how the invention can be produced. In these figures, identical references denote similar elements. More particularly:

FIGS. 3A, 3B and 3C show a first example of signaling for the throttle hand controls of an aircraft;

FIGS. 4A, 4B and 4C show a second example of signaling for the throttle hand controls of an aircraft;

DETAILED DESCRIPTION

Figure 1:
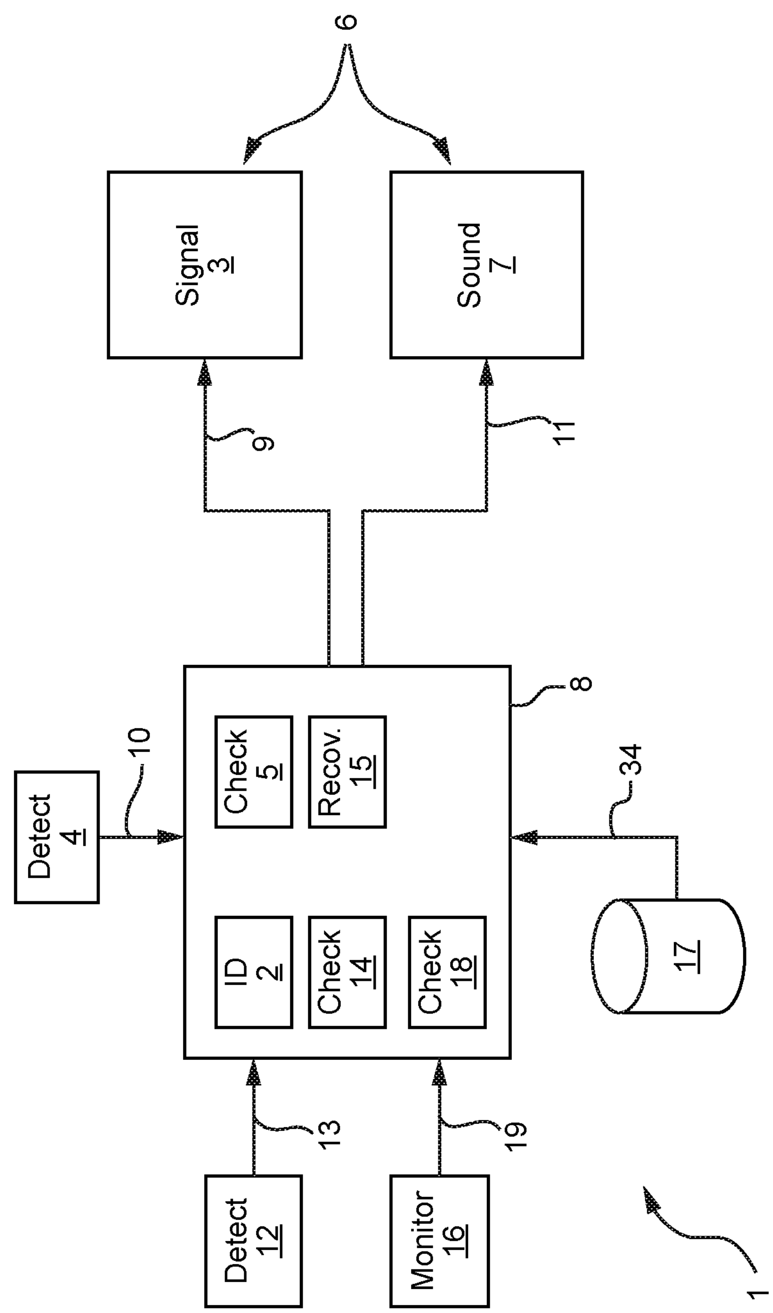
FIG. 1 is a block diagram of a particular embodiment of a device for aiding in the management of a check-list.

The system 1 represented schematically a particular embodiment in FIG. 1 and that makes it possible to illustrate the invention, is intended to aid one or more pilots of an aircraft in managing check-lists on the aircraft (not represented), in particular a transport airplane, on which said system 1 is embedded.

Check-lists comprise a series (or succession) of steps or procedures specifying actions or commands that the pilot must carry out prior to starting a flight, prior to take-off, during flight or after landing. The actions or commands typically require the actuation of actuation elements on the aircraft by the pilot. An actuation element can be any member, button (rotary, pressure activated, etc.), lever or control device, or any touch element (touch screen, touch command, etc.) present in the cockpit of the aircraft and that can be actuated (touched, depressed, pulled, etc.) by a pilot of the aircraft, to command the implementation of a particular action (or control).

A check-list is typically standardized for an aircraft model or type. These standard check-lists are used in nominal operating conditions (or in a nominal operation) or upon an alert. Standardized check-lists are typically provided for many different conditions associated with an aircraft, such as for take-off, in flight situations and for landing. For example, check-lists are provided in case of an alert issued by a monitoring system of the ECAM (“Electronic Centralized Aircraft Monitoring”) type.

The system 1 includes:

(i) an identification unit 2 configured to identify at least one actuation element to be actuated to implement a current control (step) from a check-list currently being managed. Current control is understood to mean the control that has to be carried out at the current instant out of the plurality of successive controls of the check-list which is being managed (or implemented). The identification unit may be a software application in a computer system in the aircraft, such as a computer system handling the cockpit displays, actuation elements and other interfaces between the aircrew (pilots) and the aircraft. The identification unit 2 may communicate with an electronic check-list, such as stored in a database 17, to determine which control or step of the check-list the pilot is executing;

(ii) a signaling unit 3 configured to highlight, visually, the actuation element identified by the identification unit 2. The signaling unit may be a computer-controlled software application run by the computer system and lighting device or graphical user display device;

(iii) a detection unit 4 configured to perform proximity monitoring of actuation elements and to be able, in particular, to detect a hand of a pilot which nears an actuation element or touches the actuation element. A detection unit may be a touch screen on a computerized cockpit instrument display screen, or a monitoring video-camera positioned to view the hands of a pilot and detect a position of the hand or finger with respect to the actuation elements in a cockpit;

(iv) a checking unit 5 configured to check, if appropriate, whether the position of the hand of the pilot (detected by the detection unit 4) is consistent with the position of the actuation element identified and highlighted by the signaling unit 3, for the actuation thereof, that is to say to ensure that the hand nears (or touches) the correct actuation element (consistency in this case) and not an actuation element that must not be actuated (absence of consistency in this case). The checking unit may be a software application run by the computer system and configured to analyze data obtained from the detection unit to determine whether the pilot's hand or finger has touched the highlighted actuation element; and (v) at least one alert unit 6 configured to alert the pilot to a risk of incorrect actuation, in case of absence of consistency between the detected position of the hand of the pilot and the position of the highlighted actuation element. The alert unit may be a software application running on the computer system and configured to issue an alert, such as a graphical image or a sound, indicating a discrepancy between the hand of the pilot and the highlighted actuation element.

The alert unit 6 may be part of the signaling unit 3 that makes it possible to implement a visual highlighting (or an alert), and a sound generation unit 7 making it possible to implement an audible alert.

The system 1 thus makes it possible to guide the pilot in the actuation that he or she must carry out by highlighting (via the signaling unit 3) the actuation element to be actuated, to implement the current control from the check-list.

In addition, the system 1 makes it possible to detect (via the detection unit 4 and the checking unit 5) an intention to perform an incorrect actuation and to alert, if necessary (via the alert unit 6), the pilot for him or her to abstain from carrying out such an incorrect actuation. The aid thus provided by the system 1 makes it possible to simplify the management of a check-list and above all to greatly reduce any possible actuation errors in managing the check-list.

The signaling unit 3 is configured to supply information, in particular alerts or guidance of visual type, through a particular visual signaling, generally in proximity, on or around an actuation element. Furthermore, the sound generation unit 7 is configured to supply information, in particular alerts or guidance, audibly, for example via at least one loudspeaker installed in the cockpit. The sound generation unit 7 can emit voice messages and/or simple audible signals (sounds or series of sounds).

Moreover, the system 1 comprises a confirmation unit for confirming an actuation intention that is said to conform (or be consistent), when the checking unit 5 concludes on a consistency between the detected position of the hand of the pilot and the position of the actuation element. This confirmation unit preferably uses the sound generation unit 7 which emits an audible message indicating a conforming actuation intention. The confirmation unit can also use the signaling unit 3 which can emit an appropriate signal, for example on a display screen of the cockpit. This confirmation which makes it possible to notify the pilot that he is in the process of performing the requested actuation, provides him or her with an additional aid by supporting him or her in his or her action.

In a particular embodiment, the identification unit 2 and the checking unit 5 form part of a central unit 8, such as a computer system handling the cockpit instrument display panels, actuation elements and other elements, which is linked via links 9, 10 and 11, respectively to the signaling unit 3, to the detection unit 4 and to the sound generation unit 7.

Moreover, the system 1 comprises a detection unit 12 configured to detect an actuation carried out and finished on an actuation element. The detection unit 12 can form part of systems to be controlled of the aircraft. This detection unit 12 informs, for example, the central unit 8 of the actuation and of the identification of this actuation element via a link 13. The system 1 comprises a checking unit 14 for checking whether this actuated actuation element does indeed correspond to the actuation element which should have been actuated. This checking unit 14 can form part of the central unit 8.

Furthermore, the system 1 comprises a confirmation unit for confirming a correct actuation of an actuation element (identified and highlighted), when this correct actuation has been observed by the checking unit 14 from information received from the detection unit 12.

The confirmation unit preferably uses the sound generation unit 7 which emits an audible message indicating a correct actuation. The confirmation unit can also use the signaling unit 3 which can emit an appropriate signal, for example on a display screen of the cockpit. This confirmation which makes it possible to inform the pilot that he or she has indeed carried out the actuation as requested, provides him or her with an additional aid in managing the check-list by indicating to him or her that he or she can go on to the next control.

The alert unit 6 is also configured to inform, audibly and/or visually, the pilot in case of an incorrect actuation, detected by the checking unit 14 from information received from the detection unit 12.

Furthermore, the system 1 comprises a recovery unit 15 configured to determine, in the case of an incorrect actuation of an actuation element, having generated a reversible control, a recovery procedure making it possible to remedy the situation generated by this incorrect actuation and to identify at least one actuation element to be actuated to carry out this recovery procedure. The recovery procedure is implemented only for a reversible control and not for an irreversible control (in which it is no longer possible to remedy the situation generated by the incorrect actuation).

This recovery unit 15 can form part of the central unit 8. The identified actuation element (having to be actuated to remedy the situation) is highlighted visually by the signaling unit 3, and it can also be signaled by the sound generation unit 7.

Thus, the system 1 makes it possible to detect an incorrect actuation and to signal it to the pilot. It is also able to provide, if possible, a recovery procedure and to guide the pilot to implement this recovery procedure. This provides a precious aid to the pilot in such a situation of incorrect actuation.

Moreover, the system 1 may comprise:

(i) a monitoring unit 16 configured to perform a monitoring of systems of the aircraft and to be able to detect, in this monitoring, if appropriate, a particular condition informing that a check-list is being implemented or has to be implemented. This particular condition can be, in particular, the actuation of an actuation element, the detection of a particular condition or of a particular situation of a system of the aircraft. etc.;

(ii) a data base 17 storing one or more predetermined check-lists, which are taken into account by the system 1 (to provide aid in the management thereof); and (iii) a checking unit 18, incorporated for example in the central unit 8 and linked via links 19 and 34 respectively to the monitoring unit 16 and to the data base 17. This checking unit 18 is configured to check, in case of detection (by the monitoring unit 16) of a particular condition relating to the implementation of a particular check-list, if this particular check-list corresponds to one of said check-lists stored in the data base 17.

The identification unit 2 is employed to identify an actuation element to be actuated, in order to implement a current control from a particular check-list, only if the checking unit 18 has confirmed that this particular check-list corresponds to one of said check-lists stored in the data base 17.

Moreover, the detection unit 4 comprises a plurality of sensors 21 arranged in proximity, around or on the actuation elements 20 concerned, which are for example installed on the instrument panel and/or the central pedestal of the cockpit of the aircraft. These sensors 21, for example of infrared type, are capable of detecting a movement, and in particular the approach of an object or of a part of a human body, such as a hand of a pilot. Any type of sensor capable of performing such a detection can be used.

Figure 2:
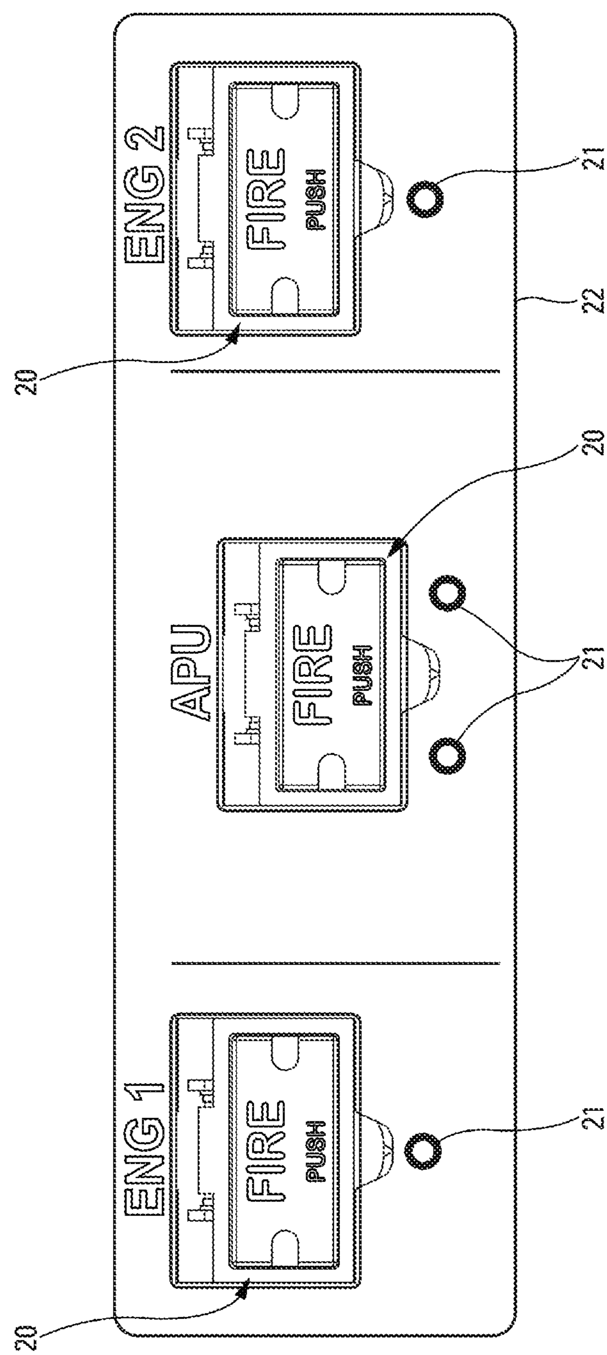
FIG. 2 schematically illustrates an example of actuation elements and of the associated sensors.

FIG. 2 shows an example of location of sensors 21, on a control zone 22 (for example of the instrument panel of the aircraft). This control zone 22 comprises three actuation elements 20, in this case push button switches ("PUSH") in case of fire ("FIRE") on one of the two engines ("ENG1"

and "ENG2") or on an auxiliary power unit ("APU"). The sensors 21 are arranged below the actuation elements 21 in this example.

Any positioning of a sensor which enables it to detect an approach of an actuation element to be monitored or contact with this actuation element can be envisaged.

Moreover, the signaling unit 3 comprises signaling elements configured to visually highlight actuation elements, in particular via displays or illuminations of types (constant illumination, flashing, etc.), of sizes, of forms (any type of possible geometrical forms, with a spot illumination or illumination over a surface) and/or of different colors (with in particular a particular color code, for example a green color for an actuation element to be actuated and a red color for an actuation element that must not be actuated). Any signaling element allowing for such a visual highlighting can be envisaged.

FIGS. 3A to 5 show different examples of signaling elements, forming part of the signaling unit 3 and capable of being activated in order to signal, as actuation element 20, one of the two throttle hand controls 23 and 24 (respectively left and right) of the aircraft. These throttle hand controls 23 and 24 which are arranged on the central pedestal of the cockpit of the aircraft, between the seats of the two pilots, make it possible to control the powers of the engines of the aircraft.

In the example of FIGS. 3A to 3C, the signaling of the throttle hand control 23 (left) is implemented using signaling elements corresponding to one or more illuminated surfaces S1 and S2 represented in black in FIGS. 3A to 3C, but presenting one or more particular colors on the aircraft, for example green. These surfaces S1 and S2 are formed, for example, by organic light-emitting diodes OLED.

In this example:

(i) the illuminated surface S1 can be provided on the handle 25 of the throttle hand control 23, as represented in FIG. 3A;

(ii) the illuminated surface S2 can be provided on the stick 26 of the throttle hand control 23, as represented in FIG. 3B; or (iii) the two illuminated surfaces S1 and S2 can be provided simultaneously on the throttle hand control 23, as represented in FIG. 3C.

In the example of FIGS. 4A to 4C, the signaling elements of the throttle hand control 24 (right) comprise a set of dots (or circles) of illumination 27. Each of these dots of illumination 27 is formed, for example, by a light-emitting diode LED.

In this example:

(i) a set 28 of dots of illumination 27 placed at the vertices of a square can be provided on the handle 25 of the throttle hand control 24, as represented in FIG. 4A; or (ii) a set 29 of dots of illumination 2, forming a row, can be provided along the stick 26 of the throttle hand control 24, as represented in FIG. 4B; or (iii) the two sets 28 and 29 can be provided simultaneously on the throttle hand control 24, as represented in FIG. 4C.

Figure 5:
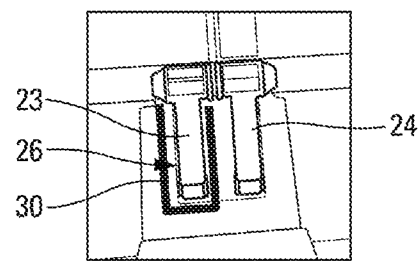
FIG. 5 shows a third example of signaling for the throttle hand controls of an aircraft.

Furthermore, in the example of FIG. 5, the signaling element of the throttle hand control 23 (left) comprises a background illumination 30, in this case in the form of an outline of rectangular type, which surrounds the base of the stick 26 of said throttle hand control 23 on three sides.

Figure 6:
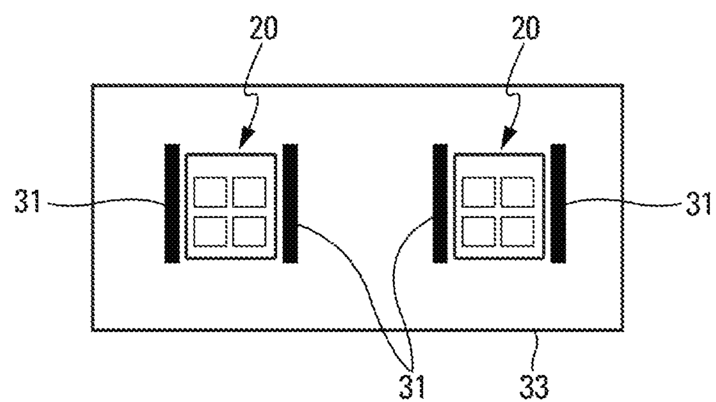
FIGS. 6 and 7 show two different types of signaling elements, associated with buttons.
Figure 7:
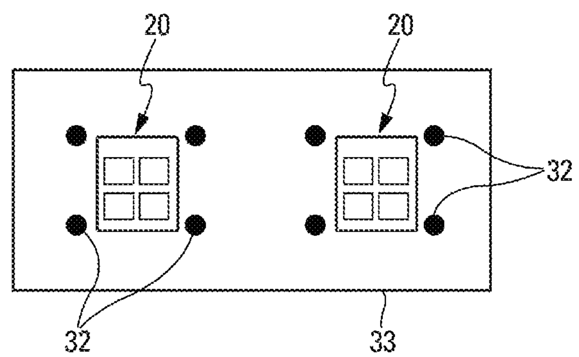

In FIGS. 6 and 7, various other examples of signaling elements 31 and 32 have been represented, forming part of the signaling unit 3 and capable of being activated in order to signal actuation elements 20 of a control zone 33 (for example of the instrument panel of the aircraft).

The signaling elements may be a light, such as illuminated line 31 or illuminated bars or dots 31, 32, that bracket the actuation element. For example, the signaling elements can be illuminated lines 31, provided for example on either side of the actuation element 20, as represented in FIG. 6; or the signaling elements can comprise a set of dots (or circles) of illumination 32, in particular in the form of light-emitting diodes, placed for example at the vertices of a square around the actuation element 20, as represented in FIG. 7.

The system 1, as described above, is capable of implementing a method for aiding in the management of check-lists, on the aircraft on which it is installed 1.

Figure 8:
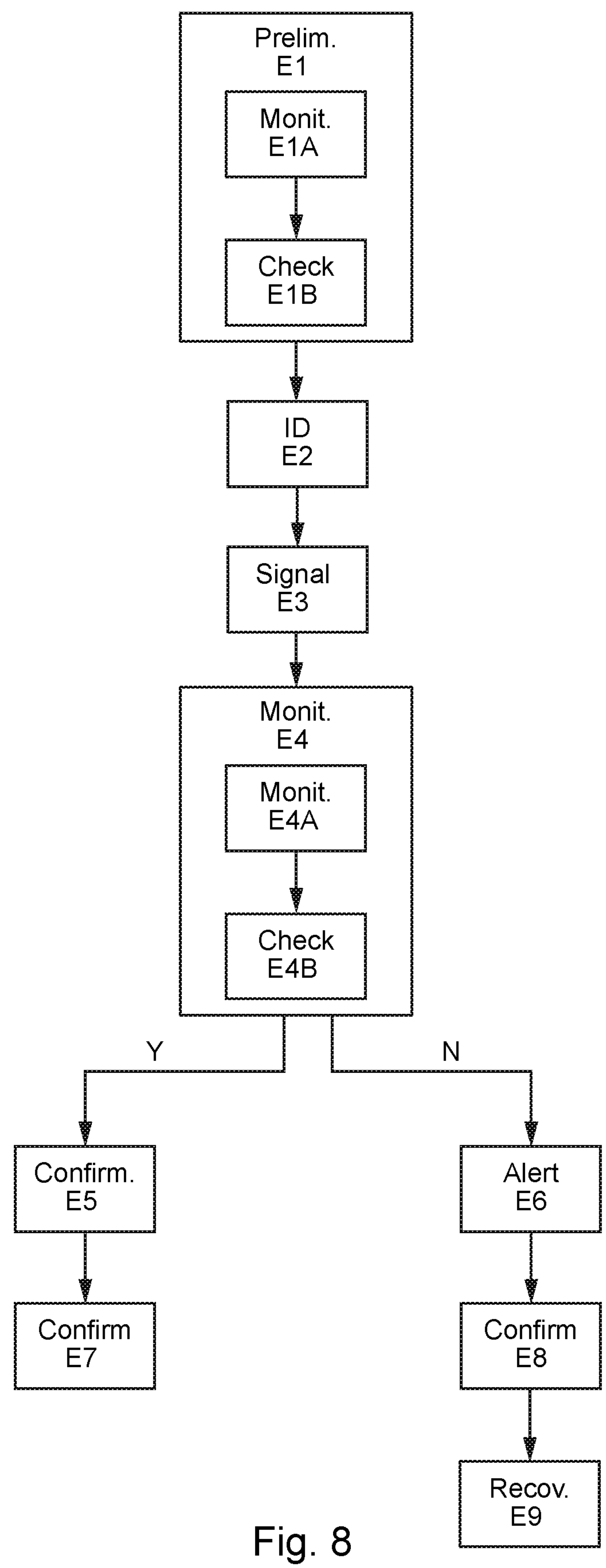
FIG. 8 is a block diagram of a method for aiding in the management of check-lists.

This management aid method comprises, as represented in FIG. 8:

a preliminary step E1 comprising a monitoring step E1A, implemented by the monitoring unit 16, including detecting, in the monitoring, if appropriate, a particular condition relating to the implementation of a check-list; and a checking step E1B, implemented by the checking unit 18, including checking, in case of detection (in the monitoring step E1A) of a particular condition relating to the implementation of a check-list, if the check-list corresponds to at least one predetermined check-list;

an identification step E2, implemented by the identification unit 2, including identifying at least one actuation element to be actuated to implement a current control of a check-list. The identification step E2 is implemented only when the checking step E1B concludes that the check-list corresponds to a predetermined (monitored) check-list;

a signaling step E3, implemented by the signaling unit 3, consisting in visually highlighting the identified actuation element;

a monitoring step E4 comprising a detection step EA4, implemented by the detection unit 4, making it possible to detect a position of a hand of a pilot; and a checking step E4B, implemented by the checking unit 5, including checking whether the detected position of the hand of the pilot is consistent with the position of the actuation element identified and highlighted in the signaling step E3, for the actuation thereof. The checking step may further detect that the hand is at a position corresponding to the another actuation element so that the first alert step issues the alert in response to the checking step detecting the hand at the position corresponding to the another actuation element.

Based on this monitoring, the method comprises a step E5 or a step E6, depending on whether the monitoring step E4 concludes on the consistency ("Y") or on the absence of consistency ("N") between the detected position of the hand of the pilot and the position of the identified actuation element.

The step E5 is a confirmation step for confirming a conforming actuation intention, when the checking step E4B of the monitoring step E4 concludes on a consistency between the detected position of the hand of the pilot and the position of the actuation element.

Furthermore, the method comprises a confirmation step E7 for confirming, if appropriate, a correct actuation of an identified and highlighted actuation element.

Furthermore, the step E6 is an alert step, implemented by the alert unit 6, consisting in alerting the pilot to a risk of incorrect actuation, when the checking step E4B of the monitoring step E4 concludes on an absence of consistency between the detected position of the hand of the pilot and the position of the actuation element.

The method further comprises an alert or confirmation step E8, implemented by the sound generation unit 7 in particular, consisting in informing the pilot of a correct actuation or of an incorrect actuation, depending on the case.

The method also comprises a recovery step E9, implemented by the recovery unit 15, consisting in determining, in case of incorrect actuation, at least one actuation element making it possible to remedy the situation generated by the incorrect actuation and in highlighting this actuation element.

As an illustration, an example of implementation of a current command of a check-list is presented hereinbelow.

It is assumed that there is a situation in which the current control demands that the pilots must actuate the throttle hand control 23 (left) to bring the left engine of the aircraft to idling speed.

After the identification of this throttle hand control 23, the signaling unit 3 signals this throttle hand control 23, for example using one of the signals represented in FIGS. 3A to 3C.

If the pilot moves his or her hand closer to the right throttle hand control 24, this approach is detected by sensors of the detection unit 4. The checking unit 5 deduces therefrom that this throttle hand control 24 is the wrong throttle hand control, and the alert unit 6 alerts the pilot. This alert can consist in emitting a voice message in the cockpit, via the sound generation unit 7.

As a variant or in addition, this alert can also consist in visually highlighting the throttle hand control 24, to warn the pilot that it must not be actuated, using the signaling unit 3. This can be done using one of the signalings represented in FIGS. 4A to 4C, by using in particular a particular color, for example red, and/or a particular display, for example a flashing.

Thus, alerted to this potential wrong actuation, the pilot removes his or her hand from the throttle hand control 24 and actuates the throttle hand control 23 as required.

This correct actuation is confirmed by an appropriate message emitted by the sound generation unit 7.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention is:

1. A method for aiding management of at least one check-list, managed by at least one pilot of an aircraft, the method includes:

- an identification step, implemented by an identification unit, including identifying at least one actuation element to be actuated to implement a current control from a check-list;
- a signaling step, implemented by a signaling unit, including visually highlighting the identified at least one actuation element;
- a detection step, implemented by a detection unit, including detecting a position of a hand of a pilot;
- a checking step, implemented by a checking unit, including checking whether the detected position of the hand of the pilot is consistent with a position of the identified at least one actuation element which is visually highlighted, and
- a first alert step, implemented by an alert unit, including alerting the pilot to a risk of incorrect actuation in response to an inconsistency between the detected position of the hand of the pilot and the position of the highlighted actuation element.

2. The method according to claim 1, including a second alert step, implemented by the alert unit, including informing the pilot in response to an incorrect actuation.

3. The method according to claim 2, wherein the first alert step includes identifying at least one recommended actuation element using a recovery unit.

4. The method according to claim 1, including a first confirmation step implemented by a confirmation unit and including generating a confirmation signal in response to the checking step determining that the detected position of the hand of the pilot is consistent with the position of the highlighted actuation element.

5. The method according to claim 1, including a second confirmation step implemented by the confirmation unit and including confirming a correct actuation of the identified at least one actuation element and the highlighted at least on actuation element.

6. The method according to claim 1, wherein the first alert step includes implementing at least one of the following alerts: at least one visual alert and at least one audible alert.

7. The method according to claim 1, including, implemented before the identification step:

- a monitoring step implemented by a monitoring unit and including detecting a condition relating to implementation of a check-list; and
- a checking step implemented by a checking unit and including checking the detected condition to confirm that the check-list corresponds to at least one predetermined check-list.

8. A system for aiding in the management of at least one check-list, managed by at least one pilot of an aircraft, which comprises:

- an identification unit configured to identify at least one actuation element to be actuated to implement a current control from a check-list;
- a signaling unit configured to visually highlight the identified actuation element;
- a detection unit configured to detect a position at least of a hand of a pilot;
- a checking unit configured to check whether the detected position of the hand of the pilot is consistent with a position of the identified actuation element which is visually highlighted, for the actuation thereof; and
- an alert unit configured to alert the pilot to a risk of incorrect actuation of an inconsistency between the detected position of the hand of the pilot and the position of the actuation element.

9. The system according to claim 8, further including:

- a monitoring unit configured to detect a certain condition relating to the implementation of a check-list;
- a data base storing one or more predetermined check-lists; and
- a checking unit configured to check if a check-list corresponding to the detected condition corresponds to one of the check-lists stored in the data base.

10. The system according to claim 8, including a confirmation unit configured to confirm whether an actuation intention conforms or a correct actuation.

11. The system according to claim 8, including a recovery unit configured to respond to incorrect actuation by assisting in correcting the incorrect actuation.

12. The system according claim 8, wherein the detection unit comprises a plurality of sensors.

13. The system according claim 8, wherein the signaling unit comprises a plurality of signaling elements.

14. An aircraft including a system as recited in claim 8 for aiding in the management of at least one check-list.

15. A method to assist an aircrew to execute a check-list to actuate elements in a cockpit of an aircraft, the method includes:

an identification step which automatically identifies an actuation element to be actuated to implement a current control from a check-list;

a signaling step automatically highlighting the identified actuation element;

a detection step automatically detecting a position of a hand of a pilot in response to the signaling step and until the pilot actuates the identified actuation element or another actuation element in the cockpit;

a checking step performed in conjunction with the detection step and automatically determining if a position of the hand of the pilot is at a position corresponding to the identified actuation element, and a first alert step to issue an alert to the pilot in response to the checking step determining that the position of the hand of the pilot does not correspond to a position of the identified actuation element.

16. The method of claim 15, wherein the checking step is performed during a period between the highlighting of the identified actuation element and actuation on the identified actuation element or the another actuation element.

17. The method of claim 16, wherein the checking step further detects that the hand is at a position corresponding to the another actuation element and the first alert step issues the alert in response to the checking step detecting the hand at the position corresponding to the another actuation element.

18. The method of claim 16, wherein the signaling step includes illuminating on or a light adjacent the identified actuation element to highlight the identified actuation element.

19. The method of claim 18, wherein the light is arranged to bracket the identified actuation element.

* * * * *